(12) United States Patent
Schambeck et al.

(10) Patent No.: US 7,394,353 B2
(45) Date of Patent: Jul. 1, 2008

(54) MODULAR VEHICLE KEY SYSTEM

(75) Inventors: Bernhard Schambeck, Menlo Park, CA (US); John Ananny, San Francisco, CA (US); Dietmar Fuchs, Menlo Park, CA (US); Greg Simon, San Francisco, CA (US)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 117 days.

(21) Appl. No.: 11/000,498

(22) Filed: Dec. 1, 2004

(65) Prior Publication Data

US 2006/0114101 A1 Jun. 1, 2006

(51) Int. Cl.
*B60R 25/10* (2006.01)

(52) U.S. Cl. .............. 340/426.36; 340/426.13; 340/539.11; 340/825.69; 340/825.72; 340/5.61

(58) Field of Classification Search ............ 340/426.36, 340/426.1, 426.11, 426.13, 426.16, 539.1, 340/539.11, 825.69, 5.61, 5.8; 307/10.1, 307/10.3, 10.5, 10.7
See application file for complete search history.

(56) References Cited

U.S. PATENT DOCUMENTS 6,075,454 A * 6/2000 Yamasaki ................ 340/5.61
6,452,483 B2 * 9/2002 Chen et al. ............... 340/425.5
6,724,322 B2 * 4/2004 Tang et al. ................ 340/989
2004/0005707 A1 1/2004 Pretzlaff et al.

FOREIGN PATENT DOCUMENTS

| DE | 39 00 494 A1 | 7/1990 |
|---|---|---|
| EP | 0 846 822 B1 | 8/1998 |
| WO | WO 02/067205 A1 | 8/2002 |

OTHER PUBLICATIONS

International Preliminary Report dated Jun. 20, 2007.

* cited by examiner

*Primary Examiner*—Hung Nguyen
(74) *Attorney, Agent, or Firm*—Crowell & Moring LLP

(57) ABSTRACT

A modular vehicle key device system for controlling vehicle access and operation. The device is formed by joining at least two separable modules, a first key device module containing vehicle access and/or operation authorizing elements, such as a keyless entry transmitter and/or an ignition key, and a module for off-vehicle storage of personal adjustment settings and/or other data. With each use of the modular key device, the data in the storage module is transferred to the vehicle to ensure the operator's settings and information are always present. Separating the storage module from the key device module allows others to operate the vehicle while ensuring the operator's personal data cannot be lost. Separation also enables easy transfer of an operator's settings to a like vehicle. Other embodiments allow the operator to allow vehicle operation by others, such as valets, while limiting use of individual vehicle components, such as radios.

21 Claims, 6 Drawing Sheets

MODULAR VEHICLE KEY SYSTEM

BACKGROUND AND SUMMARY OF THE INVENTION

The present invention relates to the field of key devices for authorizing access and operation of a vehicle.

Today's vehicles are equipped with a variety of comfort and convenience components, which can be adjusted to suit the operator's preferences. Many of these components are also provided with memory units, which record, for example, the position of seats, side-view mirrors, foot pedals, ventilation control settings, and the like.

For the convenience of the operator, it is now common for a specific set of such personal preferences to be associated with a specific vehicle key or keyless entry transmitter. This association is maintained in a memory unit in the vehicle. When the key is inserted into a lock or the keyless entry transmitter is activated, the vehicle recognizes the key or transmitter as belonging to a certain operator, and commands the various adjustable vehicle components to adjust themselves to the operator's previously stored personal settings.

Similar functionality is also provided by the latest passive keyless access and operation authorization systems, in which a vehicle transceiver system detects the approach of an authorizing device carried by the vehicle's owner, such as a key fob transponder, authenticates the fob as authorized to access and operate the vehicle, and then commands functions such as door lock opening and setting of personalized adjustments.

While automatic adjustment of vehicle components to "pre-set" positions or operating modes generally enhances customer convenience, the personalization of vehicle functions also presents problems. Existing personalization systems are limited to setting an operator's personal preferences in one specific vehicle, with storage of these preferences in that vehicle. In such systems, there is no provision for transfer of the operator's personal preferences, to other vehicles or other remote storage locations, such as a central back-up server maintained by the vehicle manufacturer. Thus, if a customer wishes to use their preferred settings in another vehicle, they have to re-enter their personal data and configure vehicle equipment settings all over again, i.e., "from scratch," even if the new vehicle is exactly the same model with the same options.

In addition, because the vehicle's key devices (including the ignition key, keyless entry transmitter and/or passive keyless entry authorizing device) are also limited to the specific vehicle, the customer cannot separate the vehicle's operator identification function from the vehicle access and driving rights associated with the key devices. This means, for example, if a person A loans their vehicle to person B, in the course of operating the vehicle person B could override the personalization settings and data of person A, who has no way to protect, or more importantly, to recover their lost personalization data.

Due to the inability to save and protect their personal preference settings and other personal information (collectively, "personal data"), many customers hesitate to store personal data in their vehicles. Moreover, due to the lack of storage of an operator's personal settings with a specific key device, some customers have had difficulty understanding the concept that two identical-appearing keyless entry controllers, which come with a vehicle, do not apply the personal preferences of whoever is using a controller, but each instead must be treated as identifying a different driver.

The present invention addresses the foregoing problems, while providing additional functionality and convenience to a vehicle customer. The invention provides a modular key device with at least two conveniently separable modules, where each individual module performs a different function. A first module, known as a key device module, contains elements used for authorizing vehicle access and/or vehicle operation, such as an ignition key and a keyless entry transmitter. The key device module is configured to be separable from at least one additional module, where at least one of the other modules releasably joined to the key device module may be used as an external (off-vehicle) data storage module containing, for example, an operator's personal data. Alternatively, the data storage module may be configured to be maintained separate from the key device module, such as on a common key ring, but able to exchange wireless signals with the key device module.

A memory unit, such as an electronic memory chip, is included in the data storage module. The memory may be used to store the operator's personal data, including personal vehicle equipment setting preferences outside the vehicle. If sufficient memory is provided in the data storage module, the memory may also be used as a mass storage device for storage of other data transferred from the vehicle, such as vehicle specific information (e.g., vehicle identification or service information) or additional personal data, such as an electronic telephone contact database maintained in a vehicle cellular telephone system memory, digital audio or video files and/or navigation information.

The modular key device may also be arranged to support additional detachable modules, such as a key ring attachment point module or a miniature flashlight module. The modules may be arranged such that a single release action, such as depressing a button, releases all or some of the modules from one another. Alternative approaches to release arrangements, such as multi-step release buttons or separate release mechanisms on each module, are possible. Because designs for such release mechanisms are well known, a comprehensive listing of alternatives is not provided here.

The present invention allows the customer to store his personal settings for various components in the vehicle in the data storage module, separate from the vehicle, thereby eliminating the possibility of other operators inadvertently altering or deleting the customer's settings. Each time the customer enters and/or operates the vehicle, the personal settings stored in the data storage module of the key device may be transferred to the vehicle, thereby synchronizing the settings in the vehicle to the customer's preferences and overwriting any settings which may have been altered by a previous driver. The personal data may be transmitted either directly via a dedicated wireless transmitter or via an indirect route, for example, through a transmitter in the key device module, a passive device interrogation system based in the vehicle, or through direct electrical contact when the key device is inserted into a lock mechanism. Similarly, updated information may be transferred to the data storage module when the operator sets a new equipment setting in the vehicle.

Embedded wireless communications technology, such as an RF (radio frequency) or infrared transceiver, is incorporated into one or more of the modules to allow information and operating commands to pass between the modules and the vehicle. The data may be transferred by multiple independent transmitters embedded within each module, or, with appropriate inter-module connections, over a shared transmitter.

The present modular key device also permits an operator to retain the data storage module, while giving others, such as a valet, only the access and operation module. The operator may be provided with the ability to selectively choose the level of access provided by the access and operation module. For example, an acquaintance may be granted full operation permission, while a valet is allowed only limited vehicle operation permission. This access and operation key device module, which provides the traditional car-key functions for access and driving permission, may or may not be further split up in more than one separable sub-modules in order to permit the owner to authorize others to operate the vehicle at different access or trust levels. The expression "access or trust level" represents not only physical access into the vehicle and its different parts (trunk, glove box, etc.), but also stands for accessing information, electronic-based functions or systems in the vehicle. This feature not only protects the user's personal information against loss, it also provides the opportunity to preclude unauthorized access of certain components in the vehicle by limiting other operators to performing only the functions they need to do.

Similar permission-based access limitations could be achieved by retaining possession of the personal data storage module. For example, equipment in the vehicle, such as the cellular telephone, navigation system or entertainment system, could be configured to require an access code before operating, and to terminate access when the device carrying the necessary access codes (i.e., the data storage module) is removed from the vehicle. The owner would then be able to keep the equipment access codes on their person when providing the key module to another operator, thereby precluding unauthorized operation of the code-controlled vehicle components.

In a preferred embodiment, the information is stored in the module memory in a universal format. Universal data format means that the data are stored in a format which is independent from a specific vehicle or option within a brand. This format is universally valid, i.e., the logic or intelligence for interpretation of this data is implemented in every individual vehicle. Alternatively, the data format may be specific to a particular vehicle brand or a particular model. Of course, an appropriate format, such as a manufacturer-specific proprietary format, may be selected as necessary or convenient for the final customer application.

In a further preferred embodiment, a vehicle may be provided with the ability to discriminate between a plurality of authorized modular key devices in or near the vehicle, determine which operator is the likely driver, and then apply the presumed driver's personal settings and other data to the vehicle. It is already known to provide a vehicle with a passive detection system which detects the presence of a device carried by the vehicle owner, such as a transponder in the form of a key fob, and authorizes access to the vehicle without the owner's intervention. In this embodiment of the present invention, a vehicle passive detection system with multiple antennae or similar "access points" spaced about the vehicle could detect the presence of more than one data storage module near or in the vehicle, and process the signals received by the access points to derive the relative position of each data storage module. The data storage module located nearest to or in the driver position could then be presumed to belong to the person most likely to be the driver, and the vehicle adjusted accordingly to the presumptive driver's personal settings.

The present invention thus provides the vehicle owner with a number of advantages, including the ability to personalize their vehicle independently from a specific vehicle access key, to protect their personal data, to apply their personal settings and transfer information cross-platform to any similarly-equipped vehicle, and to provide multi-level vehicle access and operation control. In addition, the invention serves to improve customer loyalty to the vehicle manufacturer's brand, both due to increased customer satisfaction provided by the improved ease of use, and by encouraging repeated sales where the customer can effortlessly transfer their personal settings and information into another of the manufacturer's vehicles.

Other objects, advantages and novel features of the present invention will become apparent from the following detailed description of the invention when considered in conjunction with the accompanying figures.

DETAILED DESCRIPTION OF THE DRAWINGS

Figure 1A:
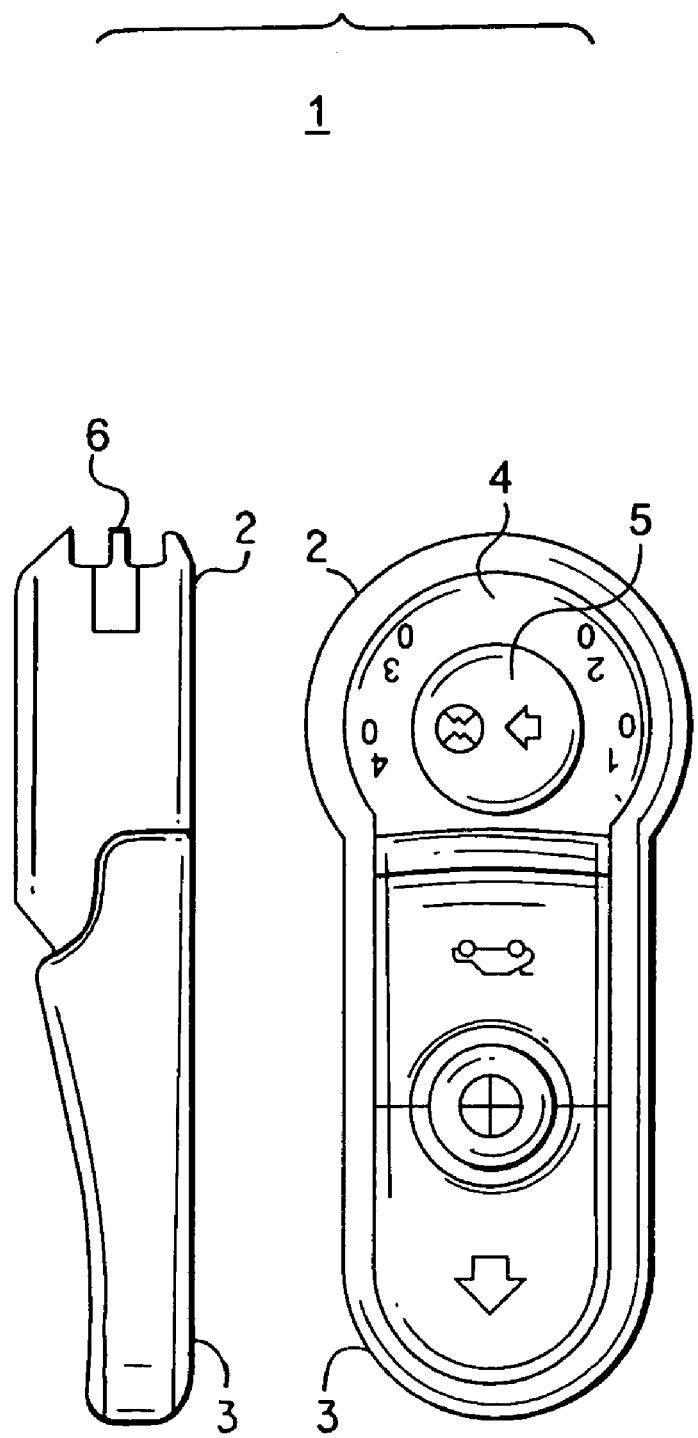
FIGS. 1a-1b are front and side illustrations of a modular key device in assembled and separated states, respectively, in accordance with an embodiment of the present invention.
Figure 1B:
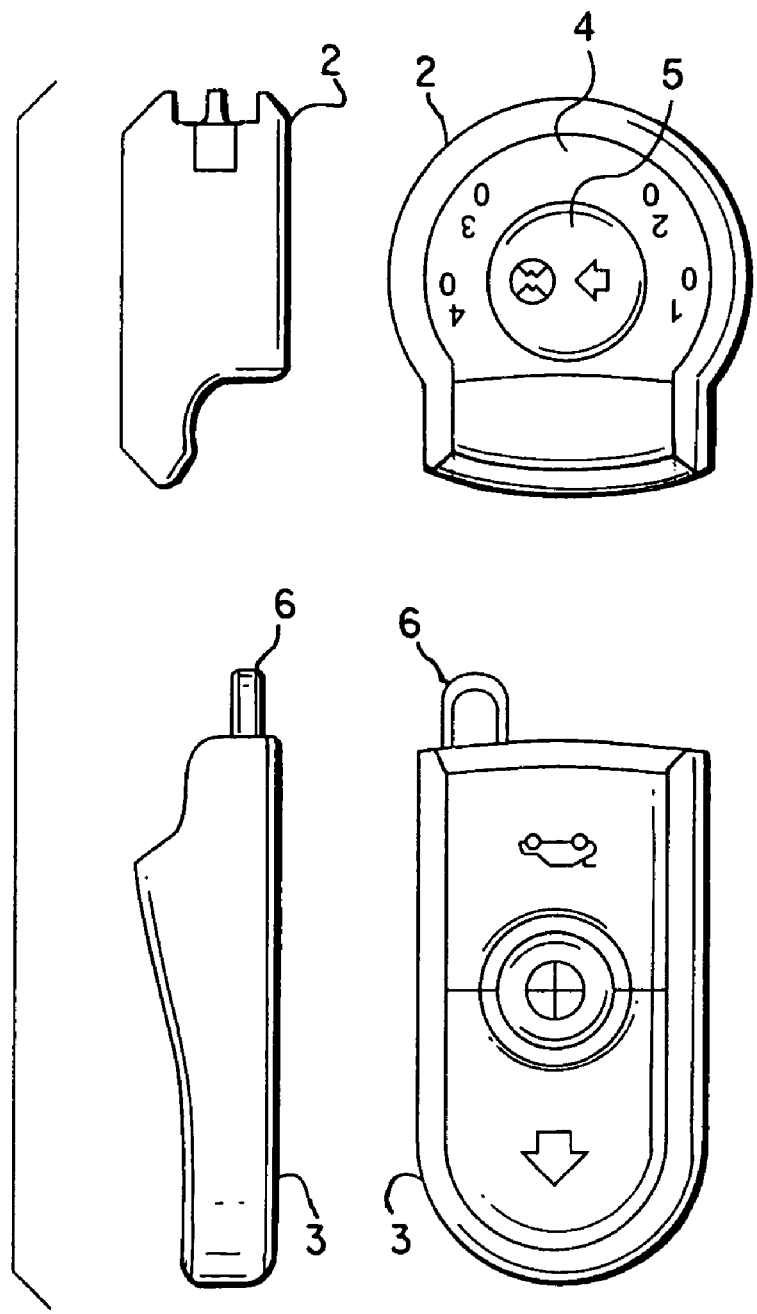

FIGS. 1a and 1b each illustrate top and side views of an embodiment of the present invention in which a two-part modular key device 1 is provided. FIG. 1a shows modular key device 1 in an assembled state, whereas FIG. 1b shows the separated state.

In this embodiment, a key device module 2 is separably joined to a personal data storage module 3. Key device module 2 is shown with an outer ring of buttons 4, which provide remote control of various vehicle features such as door lock actuation, trunk lock actuation, anti-theft alarm arming, disarming, etc. Within the ring of buttons 4, a module release button 5 is provided. Depressing release button 5 enables the key device module 2 and data storage module 3 to be separated by disengaging an internal hook element (not shown) from latch loop 6. Because the specific design of such a latch mechanism, or any other suitable latch mechanism, is well known in the art, it will not be discussed in any greater detail herein.

A vehicle operator may wish to separate the modules, for example, to provide a valet with the key device module 2 for limited authorization to drive the vehicle while retaining data storage module 3 to preclude use or alteration of the operator's personal data stored in the data storage module. Alternatively, separation of the modules permits the operator to transfer their data storage module 3 in order to transfer personal information to another compatible vehicle by joining their data storage module 3 to the other vehicle's key device module.

Figure 2:
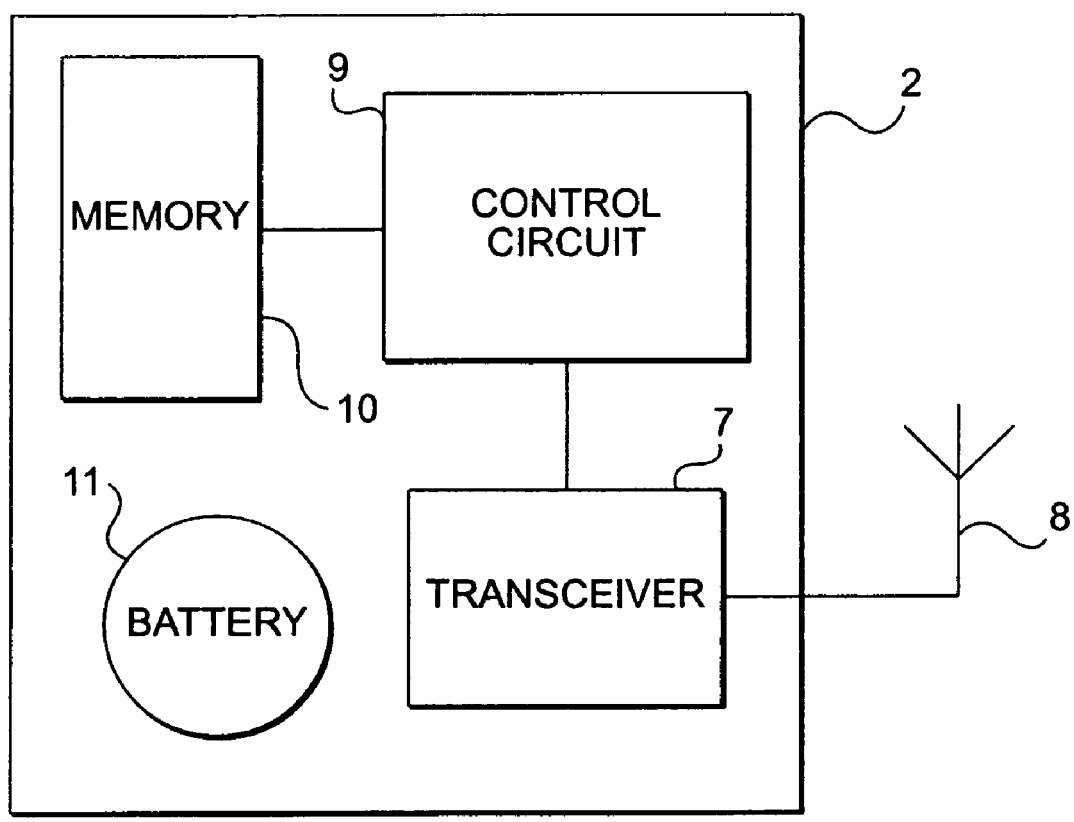
FIG. 2 is a schematic illustration of circuit components within a personal data storage module in accordance with an embodiment of the present invention.

In this embodiment, the key device module 2 includes the electrical elements shown schematically in FIG. 2. An RF transceiver 7 and antenna 8 provides the key module with the ability to transmit information, such has control commands, to a vehicle receiver (not shown). Transceiver 7 may also receive signals from the vehicle or other sources, including, for example, vehicle-specific authorization codes, access verification queries from the vehicle, and other data transmissions. The present invention is not limited to RF communications technology for communicating with the vehicle, but instead may employ any suitable transceiver technology, such as an IR (infrared) transceiver, or any combination of such transceivers, which provides the necessary communications functionality.

The transceiver 7 is controlled by a micro-electronic control circuit 9. The control circuit 9, such as a control processor, is programmed to manage the flow of information and commands to or from transceiver 7, and to store and retrieve data maintained in a module memory 10, such as a non-volatile flash memory chip in this embodiment. Control circuit 9 responds to operation of control buttons 4 and to external signals received via transceiver 7, such as a vehicle's request for confirmation of access authorization. The electronics in device module 2 are powered by a conventional "coin-format" miniature battery 11 in this embodiment.

Data storage module 3 may be provided with its own transceiver and control circuits, which would enable the module to transfer and receive information independently of key module 2. If, however, data storage module 3 is not equipped with its own transceiver, data storage module 3 may use transceiver 7 to communicate with the vehicle (or another information source or storage location such as a remote central backup server) if the storage module 3 is provided with the capability to communicate with key device module 2, such as via electrical contacts which are shared when the modules are joined together or via a low-power wireless link. Control circuit 9 may also be utilized to control the transfer of information between data storage module 3 and transceiver 7.

The data storage module 3 is further equipped with memory to store personal user data or other information. In order to facilitate exchange of such information between different vehicles, or potentially with other electronic devices, the data in this embodiment is stored in a universal format.

Figure 3A:
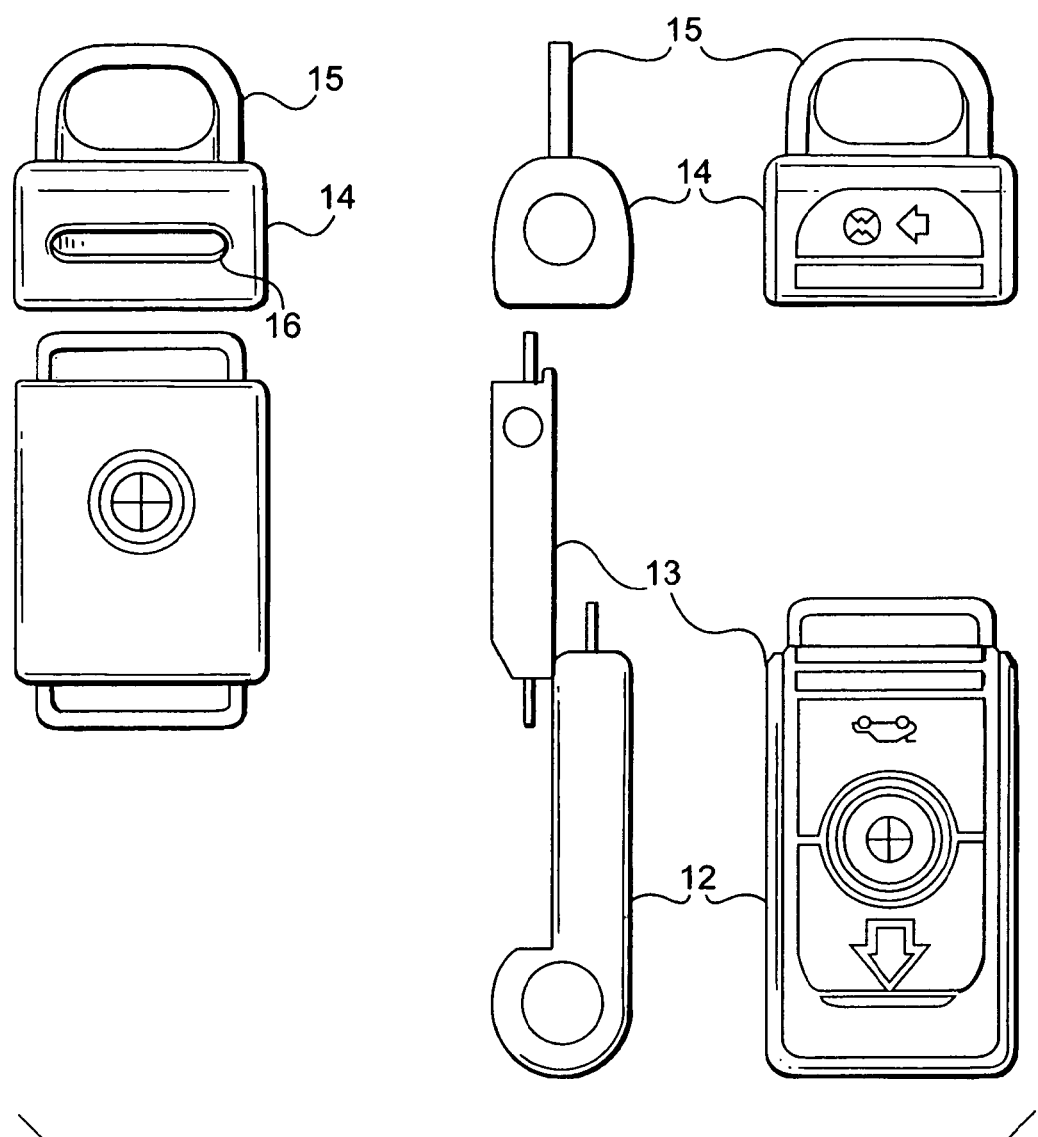
FIGS. 3a-3b are front, side and rear illustrations of a modular key device in separated and assembled states, respectively, in accordance with another embodiment of the present invention.
Figure 3B:
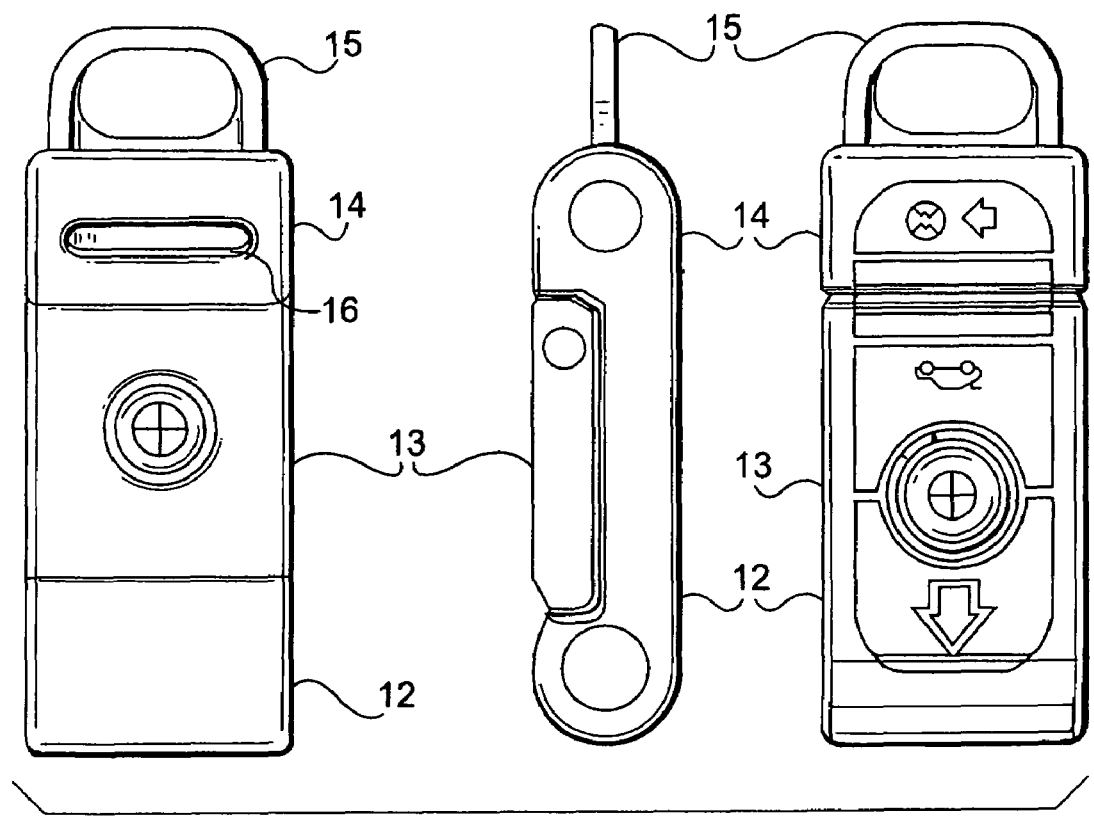

FIGS. 3a and 3b illustrate another embodiment of a modular key device in which a key device module 12 and data storage module 13 may be separably joined with a third module 14. The third module 14 in this example provides a conveniently located keychain loop 15, and in addition on its rear face houses a three-position permission-setting selection switch 16. This switch provides the user with the ability to define the level of vehicle operation authorization that will be provided to the holder of the key device module 12 once the modules are separated. For example, in a first position, the key device electronics would be programmed to only permit a valet to drive the vehicle, with no access or control of the vehicle's electronic components. A second position may provide a friend or a family member with the ability to operate some of the vehicle's systems auxiliary systems, but not others, and preclude storage of new system settings. A third switch position could permit full vehicle access and operation authorization.

It should be readily apparent that present invention's modular approach to vehicle key devices provides tremendous flexibility, allowing a vehicle designer to specify virtually unlimited combinations of modules and module-to-module interactions to meet consumer needs and/or demands. Accordingly, the foregoing embodiments are intended as merely illustrative of the present invention, and are not intended to limit the scope of the invention to these particular embodiments.

Figure 4:
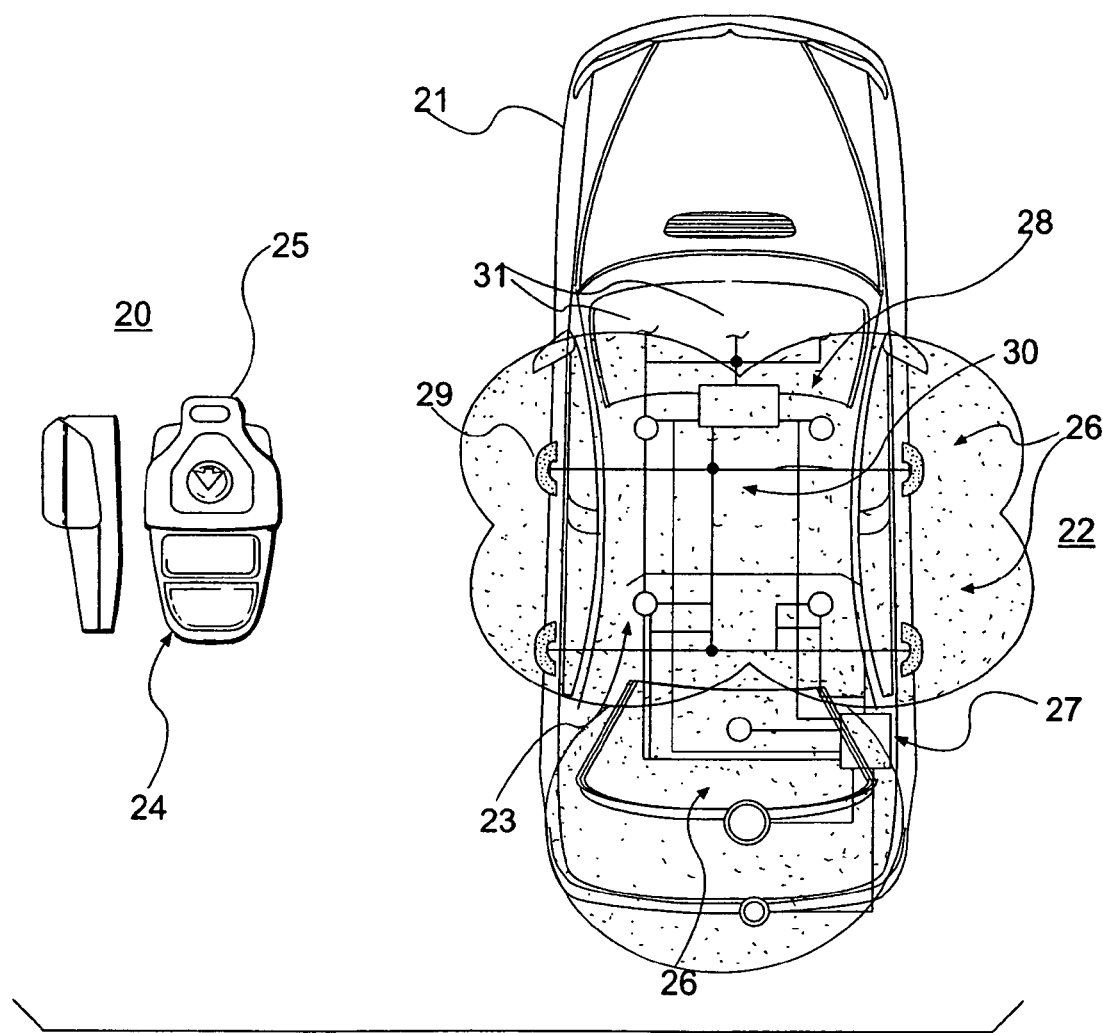
FIG. 4 is an illustration of an embodiment of the present invention in which multiple communications signal receivers are employed to provide operator detection and discrimination functionality.

In practice, the modular key device may be used as follows. As shown in FIG. 4, a modular key device 20 is provided with a vehicle 21 equipped with a variety of electronic devices, including vehicle assess and operation authorization systems. A vehicle access system 22 enables keyless entry to the vehicle and keyless authorization to operate the vehicle. In this embodiment, access system 22 is an integrated electronic access control system used in certain BMW vehicles called the BMW "Comfort Access" system. The "Comfort Access" system 22 uses multiple antennas 23 distributed and integrated into various parts of the vehicle to exchange vehicle access and authorization signals and other information with key device module 24 and data storage module 25.

The reception range 26 of each antenna disposed about the vehicle is limited, allowing differentiation between multiple modular key devices within range. Signals to and from the array of antennas 23 are processed by an access point 27, which in turn communicates with the vehicle's access system controller 28. One function of the vehicle controller 28, already known in the art, is to determine whether an access request received by the controller is an authorized access request, and if so, to command the unlocking of door locks 29 via a vehicle lock control network 30.

The vehicle access system controller 28 in the "Comfort Access" system also is linked to a central communications network with branches 31 to other vehicle equipment (not shown), such as seat position controllers, navigation systems and cellular telephone systems which may contain personal data, including personal settings for the vehicle equipment and other data such as telephone numbers stored in a cellular telephone system memory. The vehicle controller 28 communicates with other vehicle components over the network branches 31. For example, the controller 28 may send a command to a vehicle's seat controller in response to an unlock command from a remote control, in order to cause the driver's seat to be moved into a position previously associated with a specific remote keyless entry device. The controller 28 may also engage in two-way communications with at least some of the vehicle's networked equipment in order to extract personal data or other information from the vehicle equipment, and/or to pass information received by the controller 28 from an outside source to the appropriate vehicle equipment.

With the modular key device 20, once an operator has set personal preference settings or placed other data into a vehicle system, controller 28 may extract the personal information from the various networked vehicle systems, and transmit the information to data storage module 25. In this embodiment, data storage module 25 is provided with its own RF transceiver and circuitry for processing the received personal information and storing it in module 25's memory. The timing of the transfer of personal data to the storage module may be defined in any desired manner, e.g., controller 28 may extract information from the various vehicle systems at regular intervals as the vehicle is being operated. Alternatively, data could be extracted at predetermined events, such as when the vehicle ignition is shut off or the vehicle door locks are locked.

Once an operator's personal data has been delivered to the memory of the data storage module of the user's modular key device 20, the operator's personal settings and other data are safe from alteration or deletion by another user of the vehicle. In this embodiment, each time the user approaches the vehicle and activates the vehicle access system (whether by depressing an "unlock" button on key device module 24 or by coming into range of a proximity-detection-based vehicle access system), the operator's personal data and other information is transmitted from data storage module 25 to the vehicle access system controller 28, which in turn passes the data to the appropriate vehicle equipment to ensure the operator's settings and information are as they were when the operator last drove the vehicle.

The modular key device thus provides the operator with the ability to separate the vehicle access and operation authorization functions (represented in key device module 24) from the vehicle configuration memory (in data storage module 25) when desired to permit others to operate the vehicle, without fear of losing the operator's personal data.

In addition to preserving the user's personal data, the modular key device 20 may be used to preclude operation of certain of the vehicle systems. Here, a vehicle stereo system is programmed to require an access code before it will operate. The required access code is extracted by controller 28 and stored in data storage module 25 (alternatively, the code could be stored in a third module included with modular key device 20). As part of the transfer of information back to the vehicle 21 when the operator subsequently re-enters the vehicle, the stereo code is passed through controller 28 to the stereo. The stereo verifies the code, and then unlocks itself for operation. With this feature, the modular key device 20 permits the operator to preclude operation of selected equipment by others, by simply retaining the data storage module 25 (and/or any additional equipment control module(s)) separate from the key device module 24.

A further embodiment of this system includes vehicle-based or external computer-based utility programs, which allow the operator to selectively customize which personal data or other information is to be transferred from or to the vehicle. This would provide the operator with the option of disabling only selected vehicle equipment, while allowing other equipment to be available for use. For example, the operator could use the selective disabling feature to preclude a valet's access to a vehicle cellular telephone and contact list, while choosing at a different time to allow a family member to have access to the cellular phone when they are operating the vehicle. Similar functionality alternatively could be provided with a three-module key device, by maintaining the equipment operation authorization codes in a module separate from the operator's data storage module, and providing a valet with only the key device module (i.e., no telephone authorization). By providing the family member with both the key device module and a properly coded equipment authorization module, telephone use would be enabled, while the operator's personal data would still be protected in the retained data storage module.

Another embodiment of the present invention is a further development of the foregoing system. Due to the design of the antenna array of the BMW "Comfort Access" system in vehicle 21, the limited range 26 of each antenna 23 makes it possible to determine the directional orientation of a nearby modular key device 20 relative to the vehicle. The array further allows the system to differentiate between two or more modular key devices 20 simultaneously within range. Accordingly, by knowing the relative position of each modular key device, it is possible to predict which of the devices is likely to be used with the vehicle, e.g., the device closest to the driver's door or located in or closest to the driver's position. The selected operator's personal data could then be transferred from their data storage module to the vehicle.

Similarly, the array also permits prediction of where a passenger with their own modular key device will be located within the vehicle (e.g., in or near the front and rear passenger positions). This permits the simultaneous transfer of at least the passenger personal settings relevant to the passenger position to be occupied, such as the passenger's seating position and ventilation setting preferences for that particular location within the vehicle, and the automatic adjustment of the vehicle components to suit the passenger. The data transfer optionally may include other passenger data, such as the passenger's telephone contact listings, which, for example, could be combined with the driver's contacts to make all the vehicle occupants' contacts available while the occupants are sharing the vehicle cabin.

The foregoing disclosure has been set forth merely to illustrate the invention and is not intended to be limiting. Accordingly, since modifications of the disclosed embodiments incorporating the spirit and substance of the invention may occur to persons skilled in the art, the invention should be construed broadly to include everything within the scope of the appended claims and equivalents thereof.

What is claimed is:

1. A modular vehicle access device, comprising:
an access authorization module configured to authorize at least one of access to a vehicle and driving of the vehicle;
a data storage module configured to store data, including personal adjustment settings for at least one vehicle component; and
a transmitter located in one of the modules and configured to transmit to a vehicle receiver,
wherein
the data storage module and the transmitter are configured to permit data from the data storage module to be transmitted by the transmitter, and
the access authorization module and the data storage module are configured to be releasably joined together and when joined, the access authorization module is not located within the data storage module, and the data storage module is not located within the access authorization module.

2. The modular vehicle access device of claim 1, wherein the transmitter is a wireless transmitter located in the access authorization module, and
when the modules are joined, the data storage module is electrically connected to the access authorization module to permit transfer of data from the data storage module to the transmitter.

3. The modular vehicle access device of claim 1, wherein the transmitter is a wireless transmitter located in the data storage module.

4. The modular vehicle access device of claim 3, wherein when the modules are joined, the access authorization module is electrically connected to the data storage module to permit transfer of signals from the access authorization module to the transmitter for transmission to the vehicle receiver.

5. The modular vehicle access device of claim 3, further comprising a wireless transmitter located in the access authorization module,
wherein the transmitter is configured to transmit vehicle access authorization signals to a keyless entry receiver in the vehicle.

6. The modular vehicle access device of claim 3, wherein the access authorization module includes one of a vehicle ignition key and a passive keyless access authorization device adapted to wirelessly interact with a vehicle activation proximity detection system.

7. The modular vehicle access device of claim 1, wherein the access authorization module includes one of a vehicle ignition key and a passive keyless access device adapted to wirelessly interact with a vehicle activation proximity detection system.

8. A modular vehicle operation system, comprising:
a vehicle which includes a vehicle receiver, the vehicle receiver being configured to forward operating commands to vehicle components within the vehicle;

an access authorization module configured to authorize at least one of access to the vehicle and driving of the vehicle;

a data storage module configured to store data, including personal adjustment settings for at least one vehicle component; and a transmitter located in one of the modules and configured to transmit to the vehicle receiver, wherein the access authorization module and the data storage module are configured to be releasably joined together and when joined, the access authorization module is not located within the data storage module, and the data storage module is not located within the access authorization module;

the data storage module and the transmitter are configured to permit data from the data storage module to be transmitted by the transmitter.

9. The modular vehicle operation system of claim 8, wherein the transmitter is a wireless transmitter located in the access authorization module, and when the modules are joined, the data storage module is electrically connected to the access authorization module to permit transfer of data from the data storage module to the transmitter.

10. The modular vehicle operation system of claim 8, wherein the transmitter is located in the data storage module.

11. The modular vehicle operation system of claim 10, wherein when the modules are joined, the access authorization module is electrically connected to the data storage module to permit transfer of signals from the access authorization module to the transmitter for transmission to the vehicle receiver.

12. The modular vehicle operation system of claim 10, further comprising:

a wireless transmitter located in the access authorization module; and a keyless entry receiver in the vehicle configured to command operation of vehicle components in response to vehicle access authorization signals transmitted by the transmitter.

13. The modular vehicle operation system of claim 12, wherein when vehicle access authorization signals are transmitted by the keyless entry transmitter, personal data is transmitted from the data storage module to the vehicle.

14. The modular vehicle operation system of claim 8, further comprising:

a vehicle activation proximity detection system which wirelessly detects the presence of a passive keyless access authorization device and commands operation of vehicle components in response to detection of the passive keyless access authorization device near the vehicle.

15. The modular vehicle operation system of claim 14, wherein the vehicle activation proximity detection system is configured to command transmission of data from the data storage module to the vehicle when the proximity detection system detects the presence of the passive keyless access authorization device.

16. The modular vehicle operation system of claim 8, wherein the data storage module stores data in a predetermined standardized format, such that the data associated with the vehicle may be transferred to another vehicle for adjustment of personal vehicle component settings in the another vehicle.

17. A method for operating vehicle components, comprising the acts of:

providing a modular vehicle access device, including
an access authorization module,
a data storage module and
a transmitter located in one of the modules,
wherein the access authorization module and the data storage module are configured to be releasably joined together and when joined, the access authorization module is not located within the data storage module, and the data storage module is not located within the access authorization module;

storing data, including personal settings for adjustment of at least one vehicle component, in the data storage module;

transferring stored data from the data storage module to the transmitter;

transmitting the transferred data from the transmitter to a vehicle receiver; and adjusting the at least one vehicle component to conform with the personal settings in the data received by the vehicle receiver.

18. A modular vehicle access system, comprising:

a plurality of access authorization modules, each individual access authorization module configured to authorize at least one of access to and driving of a vehicle associated with said individual module; and a plurality of data storage modules configured to store data, including personal adjustment settings for at least one vehicle component, wherein each of the plurality of the access authorization modules is configured to be interchangeably joined together with at least one of the plurality of data storage modules, and when joined, the access authorization module is not located within the data storage module, and the data storage module is not located within the access authorization module.

19. The modular vehicle access system of claim 18, further comprising:

a plurality of transmitters configured to transmit to at least one vehicle receiver, wherein one transmitter of the plurality of transmitters is located in each of the plurality of access authorization modules or in each of the plurality of data storage modules, and when one of the plurality of access authorization modules is interchangeably joined with one of the plurality of data storage modules, data from the data storage module may be transmitted by said one transmitter.

20. The modular vehicle access device of claim 19, wherein each of the plurality of transmitters is located in a corresponding one of the plurality of access authorization modules, and when said one of the data storage modules is interchangeably joined to said one of the access authorization modules, said data storage module and said access authorization module are electrically connected in a manner which permits data to be transferred from said data storage module to the transmitter in said access authorization module.

21. The modular vehicle access device of claim 19, wherein each of the plurality of transmitters is located in a corresponding one of the plurality of data storage modules, and when said one of the data storage modules is interchangeably joined to said one of the access authorization modules, said data storage module and said access authorization module are electrically connected in a manner which permits transfer of signals from said access authorization module to the transmitter in said data storage module.

* * * * *